United States Patent
Rudolph et al.

(10) Patent No.: US 8,776,658 B2
(45) Date of Patent: Jul. 15, 2014

(54) BAND SAW

(75) Inventors: Joachim Rudolph, Saarbruecken (DE); Stephan Eckhardt, Dresden (DE)

(73) Assignee: Gebrueder Linck Maschinenfabrik "Gatterlinck" GmbH & Co. KG, Oberkirch (DE)

( * ) Notice: Subject to any disclaimer, the term of this patent is extended or adjusted under 35 U.S.C. 154(b) by 182 days.

(21) Appl. No.: 13/155,412

(22) Filed: Jun. 8, 2011

(65) Prior Publication Data

US 2011/0296971 A1 Dec. 8, 2011

Related U.S. Application Data

(63) Continuation of application No. PCT/EP2009/008926, filed on Dec. 14, 2009.

(30) Foreign Application Priority Data

Dec. 19, 2008 (DE) .................... 10 2008 063 696

(51) Int. Cl.
*B27B 13/10* (2006.01)
(52) U.S. Cl.
USPC .............................................. 83/820; 83/814
(58) Field of Classification Search
USPC ................... 83/788–793, 814–820
See application file for complete search history.

(56) References Cited

U.S. PATENT DOCUMENTS

| | | | |
|---|---|---|---|
| 2008/0302227 A1* | 12/2008 | Viljanen | 83/820 |
| 2009/0126549 A1* | 5/2009 | Dietz et al. | 83/817 |
| 2011/0083538 A1* | 4/2011 | Dietz et al. | 83/169 |

FOREIGN PATENT DOCUMENTS

| | | | |
|---|---|---|---|
| DE | 201 05 845 U1 | | 9/2002 |
| DE | 101 16 616 A1 | | 10/2002 |
| DE | 10 2007 005 581 A1 | | 11/2007 |
| JP | 60-150001 | | 10/1985 |
| WO | WO-0047378 | * | 8/2000 |
| WO | WO 2007/014979 A1 | | 2/2007 |
| WO | WO-2010026278 | * | 3/2010 |

* cited by examiner

*Primary Examiner* — Stephen Choi
(74) *Attorney, Agent, or Firm* — Harness, Dickey & Pierce, P.L.C.

(57) ABSTRACT

A band saw comprises a band saw blade that is moved along a running direction against which a sawing material is guided in a feed direction. The band saw further includes a guide mechanism for the band saw blade comprising a plurality of magnet guide elements that are adjustable in their force for exerting a force on the band saw blade to influence its position in space. The magnet guide elements are positioned upstream and downstream of the sawing material and have at least two magnets one beside the other, as viewed along the running direction.

1 Claim, 2 Drawing Sheets

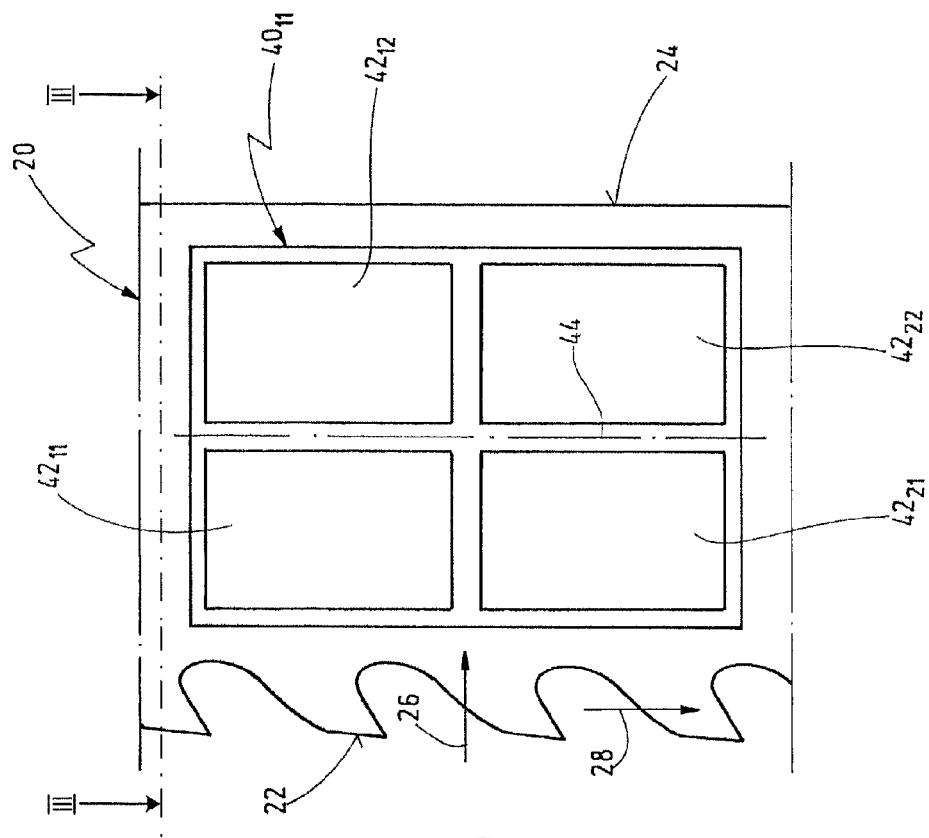
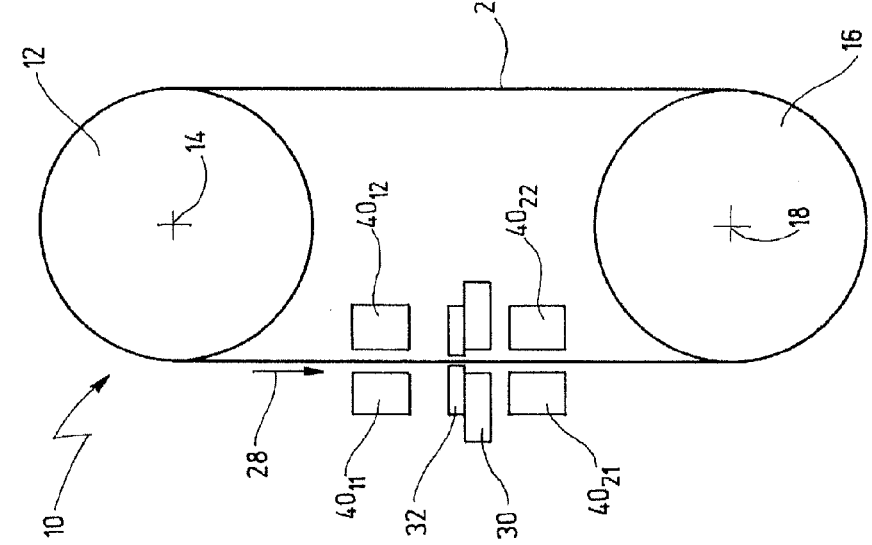
Fig. 2
Fig. 1

BAND SAW

CROSS REFERENCE TO OTHER APPLICATIONS

The present application is a continuation of pending international patent application PCT/EP2009/008926, filed Dec. 14, 2009 designating the United States, which international patent application has been published in German language and claims priority from German patent application 10 2008 063 696.7, filed Dec. 19, 2008. The entire contents of these prior applications are incorporated herein by reference.

FIELD OF THE INVENTION

The invention is related to the field of band saws.

More specifically, the invention is related to band saws having guide means for magnetically controlling the band saw blade position in space.

Still more specifically, the invention is related to a band saw comprising a band saw blade moved along a running direction, a sawing material adapted to be guided against the band saw blade along a feed direction, and guide means for the band saw blade, wherein the guide means has a plurality of magnet guide elements being adjustable in their force and exerting a force on the band saw blade for influencing a position of the band saw blade in space.

BACKGROUND OF THE INVENTION

It is well known that band saw blades during the operation of a band saw make evasive movements when the sawing material, for example an entire log or a beam or a board is guided from the front against the toothed side of the band saw blade. These evasive movements may be laterally inclined with respect to the feed direction, or the band saw blade may twist about an axis parallel to its running direction. The evasive movement may also appear periodically, i.e. as oscillations with one or more frequencies.

For avoiding such evasive movements numerous band saw blade guides have been proposed. These guides, in most cases, are configured as mechanical guides.

U.S. Patent Application Publication US 2009/0126549 A1 discloses a band saw as well as a method for positioning a band saw blade in space. This prior art band saw utilizes a magnetic guide in which a magnetic force is exerted on the band saw blade transversely to the feed direction and to the running direction by means of magnetic guide elements. Within one magnetic guide element two separate magnets may also be provided which are positioned one beside another along the feed direction and exert a first force on a front area as well as a second force on a rear area of the band saw blade. When these forces are unequal, then they exert a torque on the band saw blade about an axis parallel to its running direction. Therefore, one may counteract torsions within the band saw blade.

Within the course of the present invention one has now found that with the use of the above-described approach one may make substantial contributions to the stability and to the precision of the predetermined sawing direction of the band saw blade, however, it has turned out that there exist, moreover, higher-order components of movement, the contribution of which to the instability of the band saw blade increasing with the running velocity of the band saw blade. These components of movement, for example consist of undulated movements in the running direction of the band saw blade.

German Utility Model publication DE 201 05 845 U1 describes a magnetic band saw positioning apparatus. This apparatus essentially consists of a U-shaped guide, the legs of which extending on both sides of the band saw blade to be positioned. The guide as a whole is supported against a stationary base via springs in the feed direction of the sawing material. A row of opposing magnets, obviously permanent magnets, is housed in the two legs of the guide, the rows extending parallel to the longitudinal direction of the band saw blade. In a first embodiment of the apparatus, the row is positioned beside the tooth base of teeth of the band saw blade. In a second embodiment of the apparatus the row is positioned behind the rear edges of elongate saw blade holes arranged along the longitudinal direction. Nothing is said within the publication as to the polarization of the magnets and their interaction with the band saw blade. The legs of the guide are dimensioned so long and the guide is positioned relatively to the band saw blade such that the rear side of the band saw blade keeps a distance from the flange interconnecting the legs. Thereby, the band saw blade may be somewhat shifted in the feed direction in spite of the magnets action when high feed forces occur, wherein, finally, also the elastic support acts as a limit. The guide exclusively affects a support of the band saw blade against the feed direction and, hence, counteracts only the little critical evasive movements. Lateral evasive movements or a torsion of the band saw blade are not avoided by this prior art guide which, hence, does not contribute to the quality of the sawing cuts with respect to dimensional precision or surface quality.

SUMMARY OF THE INVENTION

It is, therefore, an object underlying the invention, to improve a band saw of the kind specified at the outset such that the afore-mentioned problems are removed or at least are minimized as far as possible. In particular, a band saw shall be provided, in which also higher-order components of movement may be effectively compensated for.

In a band saw of the type specified at the outset, this object is achieved in that the magnet guide elements have each at least two magnets one beside another upstream or downstream of the sawing material, as seen along the running direction.

The object underlying the invention is, thus, entirely solved. The provision of two individually controllable magnets one close beside another along the running direction either upstream or downstream the sawing material allows to compensate for higher order effects, in particular of oscillations propagating along the saw blade in the running direction.

In a preferred embodiment of the invention, the guide comprises magnet guide elements on both sides of the band saw blade as known per se.

Moreover, it is preferred when the guide comprises pairs of magnet guide elements positioned one beside another in the feed direction.

These measures have the advantage that the advantages of prior art magnetic guides may be combined with the above advantages.

Finally, the invention encompasses the use of magnet guide elements both upstream and downstream the sawing material.

Further advantages will become apparent from the description and the enclosed drawing.

It goes without saying that the features mentioned before and those that will be explained hereinafter may not only be used in the particularly given combination but also in other combinations or alone without leaving the scope of the present invention.

BRIEF DESCRIPTION OF THE DRAWINGS

Embodiments of the invention are depicted in the drawings and will be explained in further detail in the subsequent description.

FIG. 1 shows a schematic front elevational view of an embodiment of a band saw according to the invention;

FIG. 2 on a highly enlarged scale shows a side elevational view of a band saw blade of the band saw of FIG. 1 as well as a magnet guide element according to the present invention.

DETAILED DESCRIPTION OF THE PREFERRED EMBODIMENTS

Figure 3:
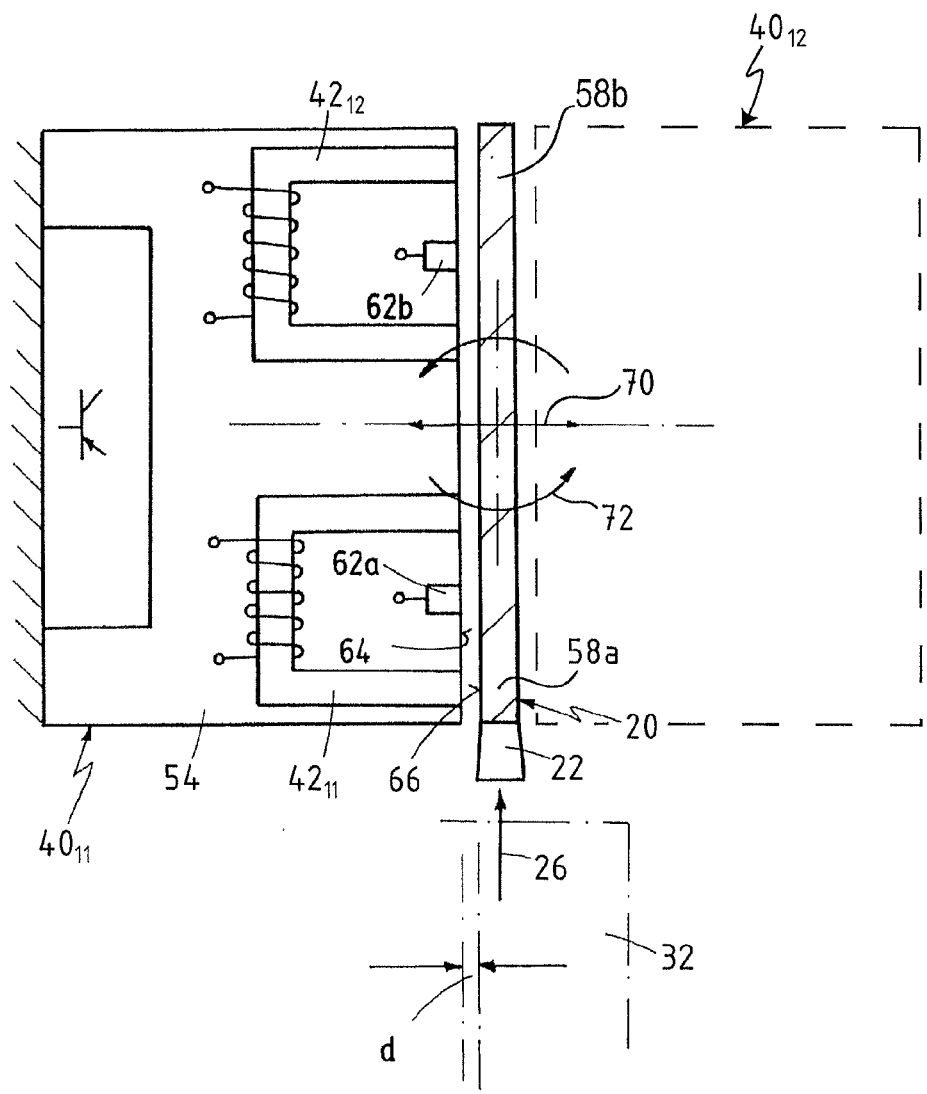
FIG. 3 shows a top plan view along line of FIG. 2.

In FIG. 1, reference numeral 10 as a whole designates a band saw of conventional design. Band saw 10 has an upper wheel 12 with an upper axis 14, and a lower wheel 16 with a lower axis 18. A band saw blade 20 is guided around wheels 12 and 16.

As shown in FIG. 2, band saw blade 20 has a toothed front side 22 as well as a smooth rear side 24. However, it goes without saying that the invention may likewise be used with band saw blades having teeth on both sides. An arrow 26 indicates the feed direction between the band saw blade 20 and a sawing material, and an arrow 28 indicates the running direction of band saw blade 20. Feed direction 26 in the depicted embodiment extends horizontally and perpendicularly with regard to the plane of FIG. 1. Running direction 28 extends vertically. Also insofar it is understood that the invention is not limited to these directions.

A sawing material 32, for example a board, lies on a sawing table 30. Band saw blade 20 in the conventional manner runs through a corresponding opening within sawing table 30 and sawing material 32 is guided in the feed direction 26 with a certain force against toothed side 22 of band saw blade 20.

When band saw blade 20 comes into engagement with sawing material 32, evasive movements of band saw blade 20 may occur. Such evasive movements may be continuous or discontinuous. If, for example, sawing material 32 is inadvertently guided against band saw blade 20 at a slant angle, band saw blade 20 reacts with a continuous evasive movement and the sawing becomes untrue. If band saw blade 20 meets a discontinuity within sawing material 32, for example a knot, then band saw blade 20 will evade discontinuously.

Further, band saw blade 20 may begin to oscillate, in particular begin torsional oscillations about an axis parallel to running direction 28 or oscillations along such an axis. Such oscillations occur, in particular, at high running speeds of band saw blade 20. Natural resonances of band saw 10 and the periodical running by of discontinuities within band saw blade 20, for example the band joint running over stationary guides, may likewise induce such oscillations.

In order to counteract this complex motional action, the depicted preferred embodiment, to start with, is provided with four magnet guide elements, as known per se, namely in the depiction of FIG. 1 and relative to sawing material 32 with a first, upper left magnet guide element $40_{11}$, a second, upper right magnet guide element $40_{12}$, a third, lower left magnet guide element $40_{21}$, and a fourth, lower right magnet guide element $40_{22}$. Magnet guide elements $40_{11}$, $40_{12}$, $40_{21}$, $40_{22}$ are positioned on both sides of band saw blade 20, in particular at the same height, and magnet guide elements $40_{11}/40_{21}$ and $40_{12}/40_{22}$, resp. are located above and below, resp. of sawing material 32.

Insofar, it is understood that, as an alternative, only one pair of magnet guide elements right/left and/or one pair of magnet guide elements upper/lower may be used, wherein the then missing magnet guide elements may be replaced by mechanical guides, in particular stationary guide blocks. Band saw blade 20 may also, as shown, be guided along a tangent line to wheels 12 and 16 or, as an alternative, be guided at a lateral distance to such tangent line, wherein band saw blade 20 in its rest position would be under a mechanical bias tension. Further details with regard to such alternatives are described in already cited DE 10 2007 005 581 A1 to which reference is made.

According to the present invention four magnets each are provided within magnet guide elements, preferably in all magnet guide elements $40_{11}$, $40_{12}$, $40_{21}$, and $40_{22}$, as shown in FIG. 2 with respect to magnet guide element $40_{11}$. In the illustration of FIG. 2 we have a first, upper left magnet $42_{11}$, a second, upper right magnet $42_{12}$, a third, lower left magnet $42_{21}$, and a fourth, lower right magnet $42_{22}$. Magnets $42_{11}$, $42_{12}$, $42_{21}$, and $42_{22}$, therefore, are positioned at the corners of an imaginary rectangle. They are adapted to be controlled individually. Accordingly, magnets $42_{11}$ and $42_{21}$, as well as magnets $42_{12}$ and $42_{22}$ are positioned one beside another in the running direction 28 and magnets $42_{11}$ and $42_{12}$ as well as magnets $42_{21}$ and $42_{22}$ are positioned one beside another in the feed direction 26. In the embodiment shown, band saw blade 20, therefore, when running by each of the magnet guide elements $40_{11}$-$40_{22}$, every time runs by four magnets. Preferably, the magnets of magnet pairs $42_{11}/42_{12}$ and $42_{21}/42_{22}$ are positioned in the front and in the rear area of band saw blade 20, resp. Magnet guide elements $40_{11}$, $40_{12}$ and $40_{21}$, $40_{22}$, resp., are, preferably, positioned just above and below, resp., sawing material 32.

Magnets $42_{11}/42_{12}$ and $42_{21}/42_{22}$, resp., arranged one beside another along feed direction 26, when energized differently, as known per se, exert a torque on band saw blade 20 about axis 44 shown in FIG. 2 which extends parallel to running direction 28 as will be explained in further detail in connection with FIG. 3.

In contrast magnets $42_{11}/42_{21}$ and $42_{12}/42_{22}$, resp., positioned one beside another along running direction 28 counteract non-homogenous movements of band saw blade 20 along the running direction, in particular oscillations propagating along running direction 28.

It goes without saying that magnet pairs $42_{11}/42_{12}$ and $42_{21}/42_{22}$, resp., positioned one beside another along feed direction 26 are advantageous and preferred, however, are not mandatory for the invention. Instead, the magnets may be provided only on one side of band saw blade 20.

FIG. 3 shows a view along line of FIG. 2.

Magnet guide element $40_{11}$ is provided with a housing 54. Within housing 54 one can see first, front electromagnet $42_{11}$ and second, rear electromagnet $42_{12}$ arranged facing a front area 58a and a rear area 58b, resp., of band saw blade 20. The terms "front" and "rear" are related to feed direction 26 of sawing material 32, for example a wood board. Below are provided third and fourth electromagnet $42_{21}$ and $42_{22}$.

Electromagnets $42_{11}$-$42_{22}$, preferably, are of same design. The design with a U-shaped yoke indicated in FIG. 3 is, of course, only to be understood as an example. As a matter of principle, any component may be used allowing to exert an adjustable force on band saw blade 20 in a contactless manner.

As four electromagnets $42_{11}$-$42_{22}$ are used in any of the magnet guide elements $40_{11}$-$40_{22}$, the entire assembly with two magnet guide elements above each other (FIG. 1), therefore, comprises as a whole eight such electromagnets or sixteen, resp., when two pairs each of magnet guide elements $40_{11}/40_{21}$ and $40_{12}/40_{22}$, resp., arranged one above the other are used on both sides of band saw blade 20.

A front sensor 62a is associated to front electromagnet $42_{11}$ and a rear sensor 62b is associated to rear electromagnet $42_{12}$. Lower electromagnets $42_{21}$ and $42_{22}$ are switched correspondingly. Sensors 62a, 62b are adapted to measure a distance magnetically, capacitively, optically, acoustically or in any other manner. Within the magnet guide they measure a distance d between the right hand (FIG. 3) surface 64 of magnet guide element $40_{11}$ and the left (FIG. 3) surface 66 of band saw blade 20 in its front area 58a and rear area 58b, resp.

If electromagnets $42_{11}$ and $42_{12}$ are energized with the same current intensity, i.e. exert the same magnet force on areas 58a and 58b, then band saw blade in the illustration of FIG. 3 will be moved to the right or to the left while maintaining its orientation, as indicated by a double arrow 70. If, however, the magnet forces of electromagnets $42_{11}$ and $42_{12}$ are set differently, then band saw blade 20 is twisted about its center axis, as shown by a pair of arrows 72. In such a way it is possible to adjust band saw blade 20 inclined under an angle relative to feed direction 26 of sawing material 32. One can then make inclined or arcuate saw cuts within sawing material 32, for example when sawing material 32 is configured conical or arcuate along feed direction 26, as is the case for naturally grown trunks or parts thereof.

Magnet pairs $42_{11}/42_{21}$ and $42_{12}/42_{22}$, resp., arranged one above another, act correspondingly on band saw blade 20. By differently energizing same, waves within band saw blade 20 propagating along running direction 28, may be erased.

By selectively controlling electromagnets $42_{11}$-$42_{22}$ one can, therefore, compensate for a lateral evasive movement and a torsion of band saw blade 20 as effectively as a propagation of waves along running direction 28. This is of particular advantage when sawing material 32 is guided with high force along feed direction 26 against toothed side 22 of band saw blade 20 and band saw blade 20 then bends away, or when band saw blade 20 comes into non-homogenous areas of sawing material 32, for example knots within a wood board.

In the arrangement of FIG. 1 the control of the lateral position of band saw blade 20 is effected by selectively controlling magnet guides $40_{11}/40_{12}$ and $40_{21}/40_{22}$, resp. on both sides of band saw blade 20. Band saw blade 20 in that situation extends along a common tangent line between wheels 12 and 14, as shown in FIG. 1.

As an alternative, the magnet guide elements, however, could also be positioned on one side of the band saw blade only, and the band saw blade on its other side could rest, as known per se, on stationary guide blocks when in its rest position, as illustrated, for example, in FIG. 1 of DE 10 2007 005 581A. Then, in the rest position, i.e. in the absence of magnet force, the band saw blade rests e.g. on the stationary guide blocks due to the conventional mechanical setting of a certain, laterally oriented bias tension of between 100 and 1,000 N, e.g. 600 N. Immediately prior to or at the starting of the band saw, the band saw blade is lifted off the guide blocks by exerting a magnet force of e.g. 700 N being higher than the mechanical bias force of e.g. 600 N, until it assumes a desired position between the guide blocks and the magnet guide elements. In this desired position the band saw blade is guided in a contactless manner. The position control is then effected about the desired magnet force of 700 N by modulation, i.e. by decreasing or by increasing the magnet force.

The invention claimed is:

1. A band saw comprising a band saw blade movable along a running direction for sawing a sawing material that is guided against said band saw blade along a feed direction, and guide means for said band saw blade, wherein said guide means has a first pair of magnetic guide elements upstream of said sawing material and positioned on opposite sides of said band saw blade, and a second pair of magnetic guide elements downstream of said sawing material and positioned on opposite sides of said band saw blade, each of said magnetic guide elements, further, having in a side elevational view of said band saw blade at least a first, upper left magnet, a second, upper right magnet, a third, lower left magnet, and a fourth, lower right magnet positioned at corners of an imaginary rectangle, wherein said first and said third magnet as well as said second and said fourth magnet are positioned one beside the other in said running direction, whereas said first and said second magnets as well as said third and said fourth magnets are positioned one beside the other in said feed direction, and further wherein each of said four magnets in each of said magnetic guide elements is adjustable individually in its force and exerting a force on said band saw blade for influencing a position of said band saw blade in space.

* * * * *